(12) United States Patent
Kim et al.

(10) Patent No.: US 10,132,414 B2
(45) Date of Patent: Nov. 20, 2018

(54) VACUUM VALVE

(71) Applicant: PRESYS CO., LTD., Gyeonggi-do (KR)

(72) Inventors: Bae-Jin Kim, Gyeonggi-do (KR); Ki Sun Choi, Gyeonggi-do (KR)

(73) Assignee: PRESYS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/528,851

(22) PCT Filed: Sep. 16, 2015

(86) PCT No.: PCT/KR2015/009695
§ 371 (c)(1),
(2) Date: May 23, 2017

(87) PCT Pub. No.: WO2016/085100
PCT Pub. Date: Jun. 2, 2016

(65) Prior Publication Data
US 2017/0268680 A1    Sep. 21, 2017

(30) Foreign Application Priority Data

Nov. 25, 2014    (KR) .......................... 10-2014-0165234

(51) Int. Cl.
*F16K 1/42*    (2006.01)
*F16K 1/52*    (2006.01)
(Continued)

(52) U.S. Cl.
CPC ................ *F16K 1/425* (2013.01); *F16K 1/52* (2013.01); *F16K 3/0254* (2013.01); *F16K 3/184* (2013.01); *F16K 27/0236* (2013.01); *F16K 1/36* (2013.01)

(58) Field of Classification Search
CPC ........ F16K 1/425; F16K 27/0236; F16K 1/52; F16K 1/36; F16K 51/02; F16K 3/0254
See application file for complete search history.

(56) References Cited

U.S. PATENT DOCUMENTS 7,637,477 B2 * 12/2009 Hiroki ............... H01L 21/67126
251/163
8,474,791 B2 * 7/2013 Ogawa .................. F16K 3/3165
251/203

(Continued)

FOREIGN PATENT DOCUMENTS

JP    2001165350 A    6/2001
KR    101236013 B1    2/2013
(Continued)

OTHER PUBLICATIONS

International Search Report issued in PCT/KR2015/009695, dated Jan. 29, 2016.

*Primary Examiner* — Marina Tietjen
(74) *Attorney, Agent, or Firm* — Marshall, Gerstein & Borun LLP

(57) ABSTRACT

A vacuum valve improving product performance of a packing ring to extend a replacement period of the packing ring is disclosed. As an opening and closing driving guide groove including a protruding groove section and first and second inclined groove sections is defined in each of both side surfaces of a driving block, and an L-motion roller inserted into and moving along the opening and closing driving guide groove is provided on an L-motion block, when the L-motion roller is disposed at an end of the first inclined groove section, one side surface of a valve blade closes an inlet, and when the L-motion roller is disposed at an end of the second inclined groove section, one side surface of the valve blade closely contacts an inner surface of the housing. The packing (Continued)

ring provided on a closing surface of the valve blade is blocked from contacting air or fluid.

5 Claims, 11 Drawing Sheets

(51) Int. Cl.
*F16K 3/02* (2006.01)
*F16K 3/18* (2006.01)
*F16K 27/02* (2006.01)
*F16K 1/36* (2006.01)

(56) References Cited

U.S. PATENT DOCUMENTS 8,800,956 B2 * 8/2014 Ishigaki .................. F16K 3/16
251/203
2014/0008452 A1 1/2014 Iammatteo et al.

FOREIGN PATENT DOCUMENTS

| KR | 101431661 B1 | 8/2014 |
| KR | 1020130113625 | 3/2017 |
| WO | WO 2013151403 | * 10/2013 |

* cited by examiner

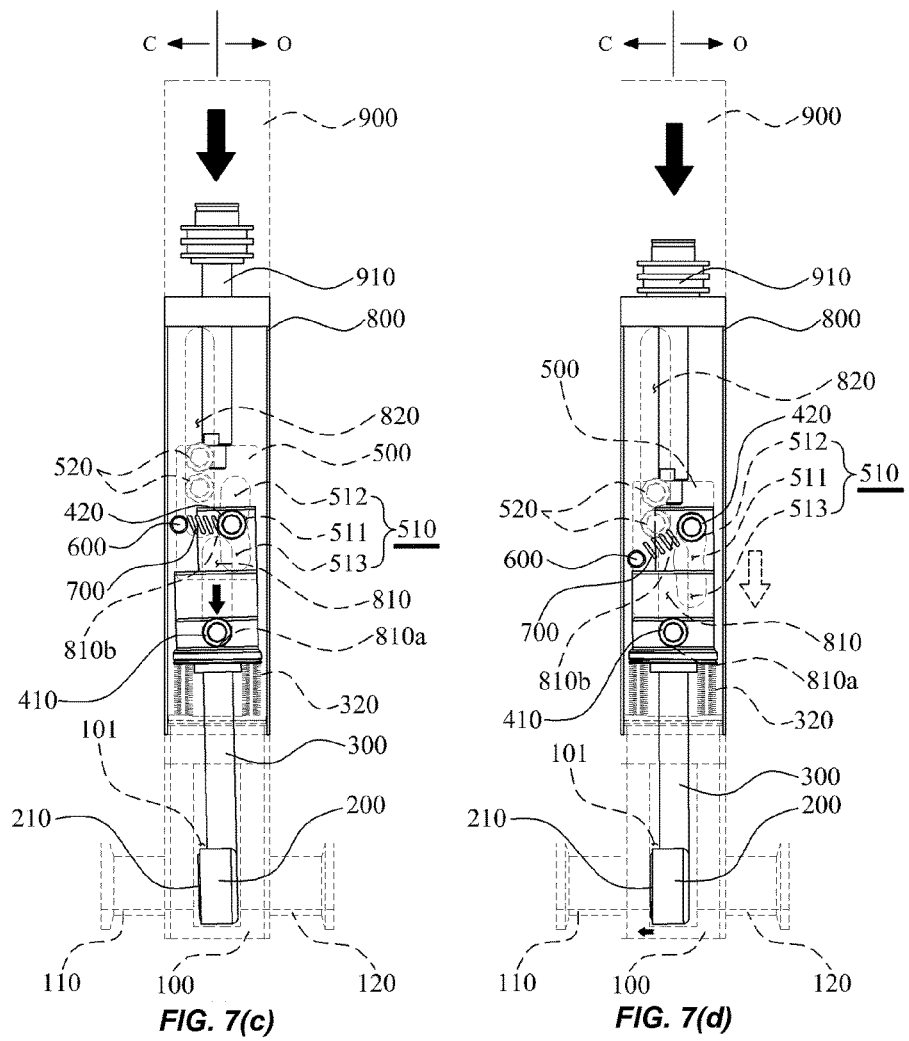

VACUUM VALVE

TECHNICAL FIELD

The present disclosure relates to a vacuum valve. More particularly, the present disclosure relates to a vacuum valve capable of improving product performance of a packing ring to extend a replacement period of the packing ring.

BACKGROUND

In general, since a semiconductor manufacturing process for manufacturing a semiconductor device requires a high degree of precision, a high degree of cleanliness and a special manufacturing technique.

Due to the above-mentioned reason, a product having high reliability and a high degree of completion may be manufactured in a state in which the semiconductor device is completely prevented from contacting foreign substances contained in the air, i.e., a vacuum state.

Meanwhile, a vacuum pump suctioning the air and other gases in a process chamber is installed outside the process chamber to maintain the vacuum state in the process chamber for manufacturing the semiconductor device.

Also, as a vacuum valve is installed between the process chamber and the vacuum pump, and the vacuum valve is opened to discharge the air and other gasses in the process chamber and closed to maintain the vacuum state in the process chamber, the process chamber may always maintain a clean vacuum state therein.

A gate valve disclosed in the below patent document 1 (Korean Registered Patent No. 10-0338164) includes: a valve box; a valve disc disposed in the valve box to face and contact a valve sheet disposed in the valve box; a valve rod sealngly protruding to perform vertical movement and inclined movement by interposing a bellows between the inside and the outside of the valve box connected to the valve disc; and a movable unit disposed outside the valve box and allowing the valve disc to move between positions facing or not facing the valve sheet by interposing the valve rod and allowing the valve rod to perform the inclined movement so that the valve disc presses the valve sheet after the valve disc is disposed on the position spaced from and facing the valve sheet. Here, the movable unit includes: a roller disposed on each of one side and the other side of each of a piston cylinder device, a piston rod of the piston cylinder device, and the valve rod to connect each other; a spring restraining to allow a lengthy inclined hole coupled to the roller, the piston rod, and the valve rod to be spaced apart from each other in a shaft direction; and a guide provided on a cylinder of the piston cylinder device to guide the vertical movement and the inclined movement of the valve rod. When the piston rod is pressed by the piston cylinder device so that the piston rod approaches the valve rod, the valve rod is inclined by interposing the roller and the lengthy inclined hole, and the valve disc presses the valve sheet. In addition, since all mechanical components for pressing the valve disc with respect to the valve sheet are not disposed in the valve box, impurities generated by wear between components is not generated in the valve box.

However, when the valve rod vertically moves so that the valve disc is spaced apart from the valve sheet to open the valve from a state in which the valve disc presses the valve sheet to close the valve, since a front portion of the valve disc is being exposed to an inner space of the valve sheet, the air and the other gases contact an O-ring made of an elastic material and provided on the front portion of the valve disc while the air and the other gases moves inside the valve sheet, and thus the O-ring is corroded and rapidly deformed to shorten a replacement period of the O-ring.

SUMMARY OF THE DISCLOSURE

The present disclosure provides embodiments derived to resolve the above-described problems and it is an object of the present disclosure is to provide a vacuum valve capable of improving product performance of a packing ring to extend a replacement period of the packing ring. Here, as an opening and closing driving guide groove including a protruding groove section and first and second inclined groove sections is defined in each of both side surfaces of a driving block, and an L-motion roller inserted into and moving along the opening and closing driving guide groove is provided on an L-motion block, when the L-motion roller is disposed at an end of the first inclined groove section, one side surface of a valve blade closes an inlet, and when the L-motion roller is disposed at an end of the second inclined groove section, one side surface of the valve blade closely contacts an inner surface of the housing. Accordingly, the packing ring provided on a closing surface of the valve blade is fundamentally blocked from contacting air or fluid, and thus the product performance of the packing ring is improved to extend the replacement period of the packing ring.

An embodiment provides a vacuum valve 1 including: a valve housing 100 including a fluid flow hole (101) defined therein and on which an inlet 110 through which fluid is introduced and an outlet 120 through which fluid is discharged are provided; a valve blade 200 disposed in the valve housing 100 to open and close the inlet 110; a valve rod 300 connected to the valve blade 200 and including a connecting projection 310 protruding from an upper portion thereof; an L-motion block 400 connected to the connecting projection 310 and including stroke rollers 410 respectively provided on both lower side surfaces thereof and L-motion rollers 420 respectively provided on both upper side surfaces thereof; a driving block 500 connected to the L-motion block 400 and including opening and closing driving guide grooves 510 respectively defined in both side surfaces thereof so that the L-motion rollers 420 are respectively inserted therein to vertically move; a spring pin 600 provided on one surface of the driving block 500; an elastic member 700 provided between the spring pin 600 and each of the L-motion rollers 420; a guide housing 800 coupled to an upper portion of the valve housing 100 and including stroke roller rail grooves 810 recessed so that the stroke rollers 410 are respectively inserted therein and defined in both inner side surfaces thereof; a cylinder 900 detachably coupled to an upper portion of the guide housing 800; a piston 910 protruding to be connected to the driving block 500 while maintaining a sealing between the inside and the outside of the cylinder 900 and vertically moving by hydraulic pressure.

In an embodiment, each of the stroke rollers 410 is more biased to a closing direction C than the L-motion roller 420.

In an embodiment, when each of the opening and closing driving guide grooves 510 has a protruding groove section 511 protruding to the closing direction C, and the L-motion roller 420 is disposed in the protruding groove section 511, the valve blade 200 is inclined to an opening direction O with respect to the stroke roller 410.

In an embodiment, when a first inclined groove section 512 inclined to the opening direction O as upward from the protruding groove section 511 is provided, and the L-motion roller 420 is disposed at an end 512a of the first inclined groove section 512, the valve blade 200 moves to the closing direction C with respect to the stroke roller 410 to close the inlet 110.

In an embodiment, when a second inclined groove section 513 inclined to the opening direction O as downward from the protruding groove section 511 is provided, and the L-motion roller 420 is disposed at an end 513a of the second inclined groove section 513, the valve blade 200 moves to the closing direction C with respect to the stroke roller 410 to closely contact an inner surface (102) of the housing (100).

According to the presently described embodiments, the problems described above are resolved and it is an object of the present disclosure is to provide the vacuum valve, Here, as the opening and closing driving guide groove including the protruding groove section and the first and second inclined groove sections is defined in each of the both side surfaces of the driving block, and the L-motion roller inserted into and moving along the opening and closing driving guide groove is provided on the L-motion block, when the L-motion roller is disposed at the end of the first inclined groove section, one side surface of the valve blade closes the inlet, and when the L-motion roller is disposed at the end of the second inclined groove section, one side surface of the valve blade closely contacts the inner surface of the housing. Accordingly, the packing ring provided on a closing surface of the valve blade is fundamentally blocked from contacting air or fluid, and thus the product performance of the packing ring is improved to extend the replacement period of the packing ring.

BRIEF DESCRIPTION OF THE DRAWINGS

FIGS. 6(a) and 6(b) and 7(c) and 7(d) are operation state views illustrating a state in which the inlet among the configuration of the vacuum valve according to the preferred embodiment is being closed.

DETAILED DESCRIPTION

Figure 1:
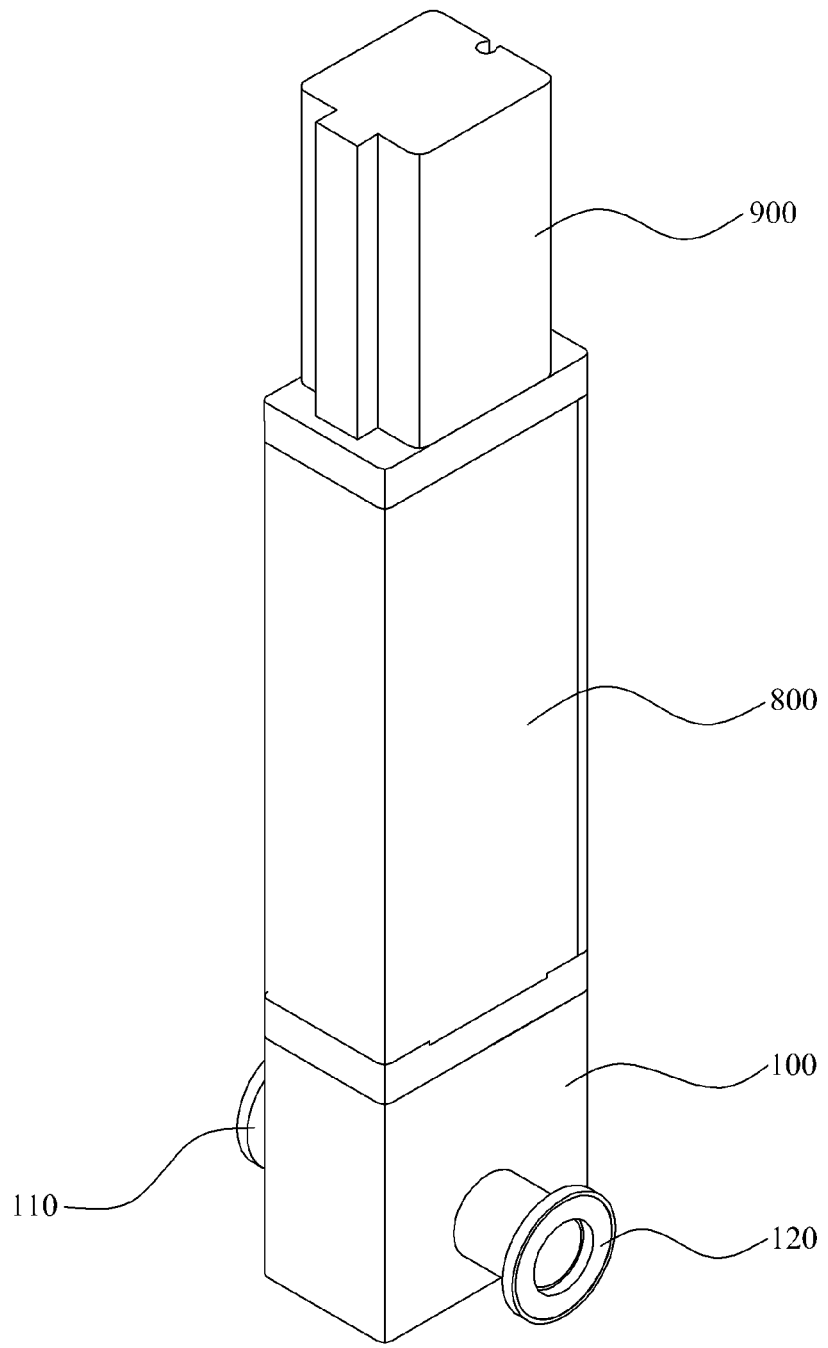
FIG. 1 is a perspective view illustrating an overall appearance of a vacuum valve according to a preferred embodiment.

Hereinafter, a vacuum valve 1 according to an embodiment will be described in detail with reference to the accompanying drawings. It is also noted that like reference numerals denote like elements or like components throughout the drawings. Moreover, detailed descriptions related to well-known functions or configurations will be ruled out in order not to unnecessarily obscure subject matters of the present disclosure.

Figure 2:
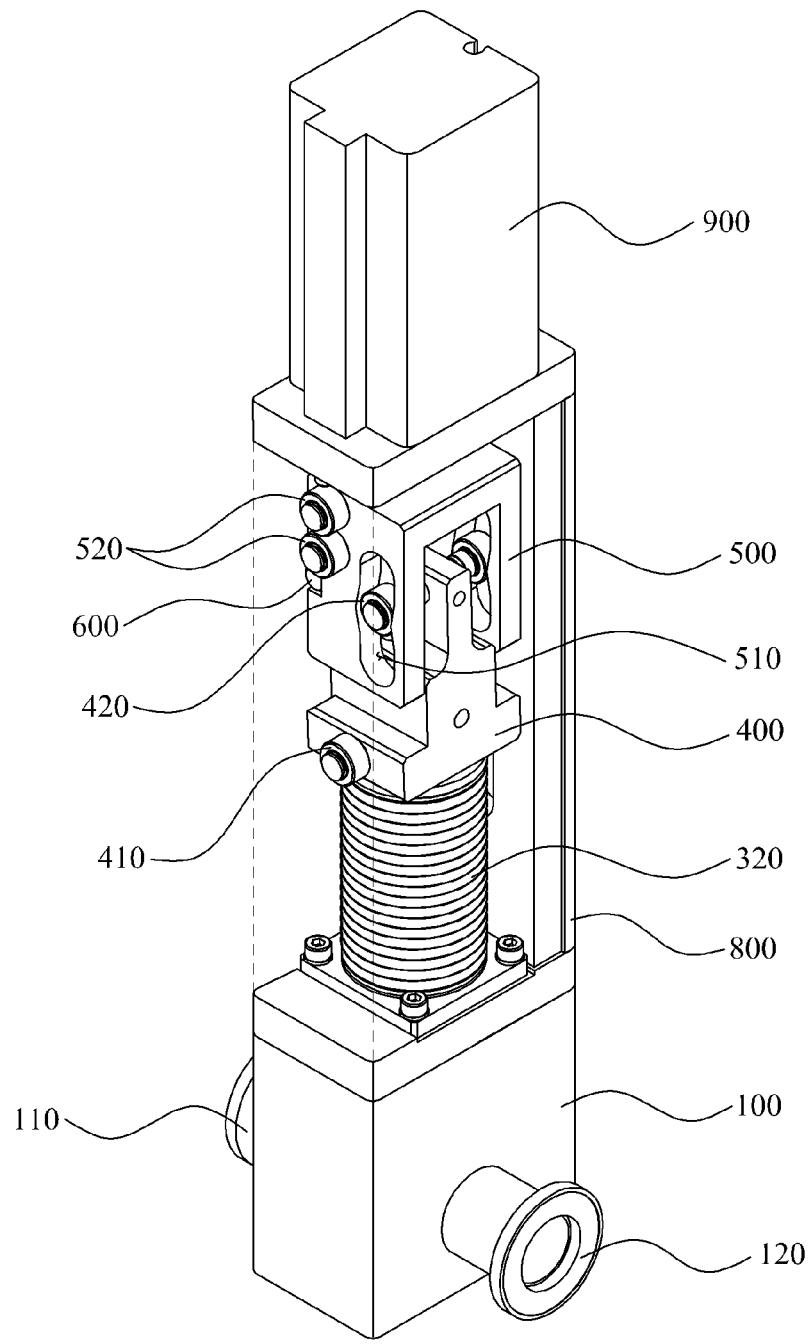
FIG. 2 is a coupling state view illustrating a state in which components provided in a guide housing in a configuration of the vacuum valve according to the preferred embodiment are coupled.
Figure 3:
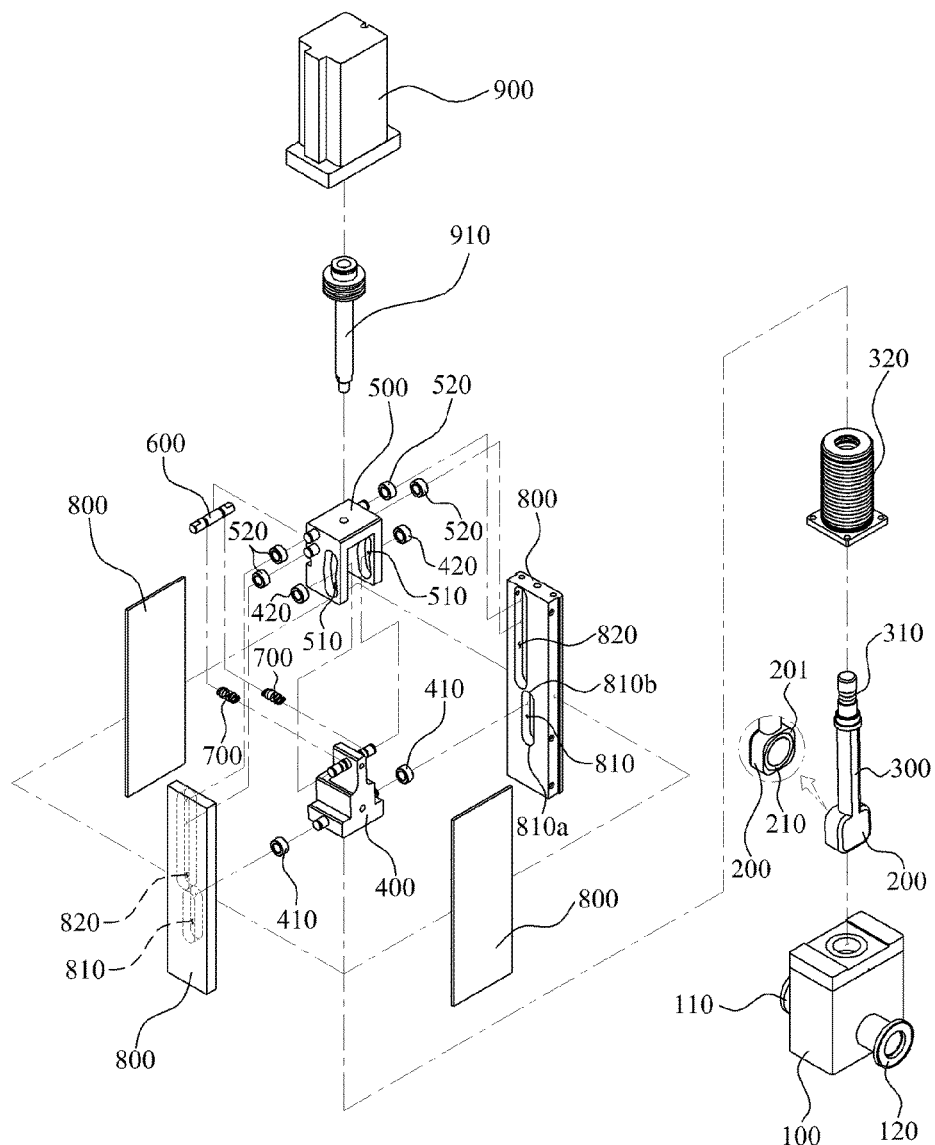
FIG. 3 is an exploded perspective view illustrating a state in which the vacuum valve according to the preferred embodiment is exploded.

As illustrated in FIG. 2 or 3, the presently described embodiments include a valve housing 100, a valve blade 200, a valve rod 300, an L-motion block 400, a driving block 500, a guide housing 800, and a cylinder 900.

Before describing various embodiments, as illustrated in FIGS. 2, 4, 6, 7, 8, and 9, it is noted that a front portion or a side portion of the guide housing 800 is not illustrated so that configurations of a bellows 320, the L-motion block 400, and the driving block 500, which are elements disposed therein, are clearly understood. In addition, as illustrated in FIGS. 5, 6, 7, 8, and 9, shapes of the valve housing 100, the bellows 320, the driving block 500, and the cylinder 900 are expressed as dotted lines to clearly express an operation state of the described embodiments.

Also, as illustrated in FIGS. 4, 6(a), 6(b), 7(c), 7(d), 8(a), 8(b), 9(c), and 9(d), it is noted that a left side of the drawing is set as a closing direction C, and a right side thereof is set as an opening direction O.

First, the valve housing 100 will be described. As illustrated in FIG. 1 or 3, the valve housing 100 is disposed between a processing chamber (not shown) and a vacuum pump (not shown) and on which an inlet 110 through which fluid is introduced and an outlet 120 through which fluid is discharged are provided.

Figure 4:
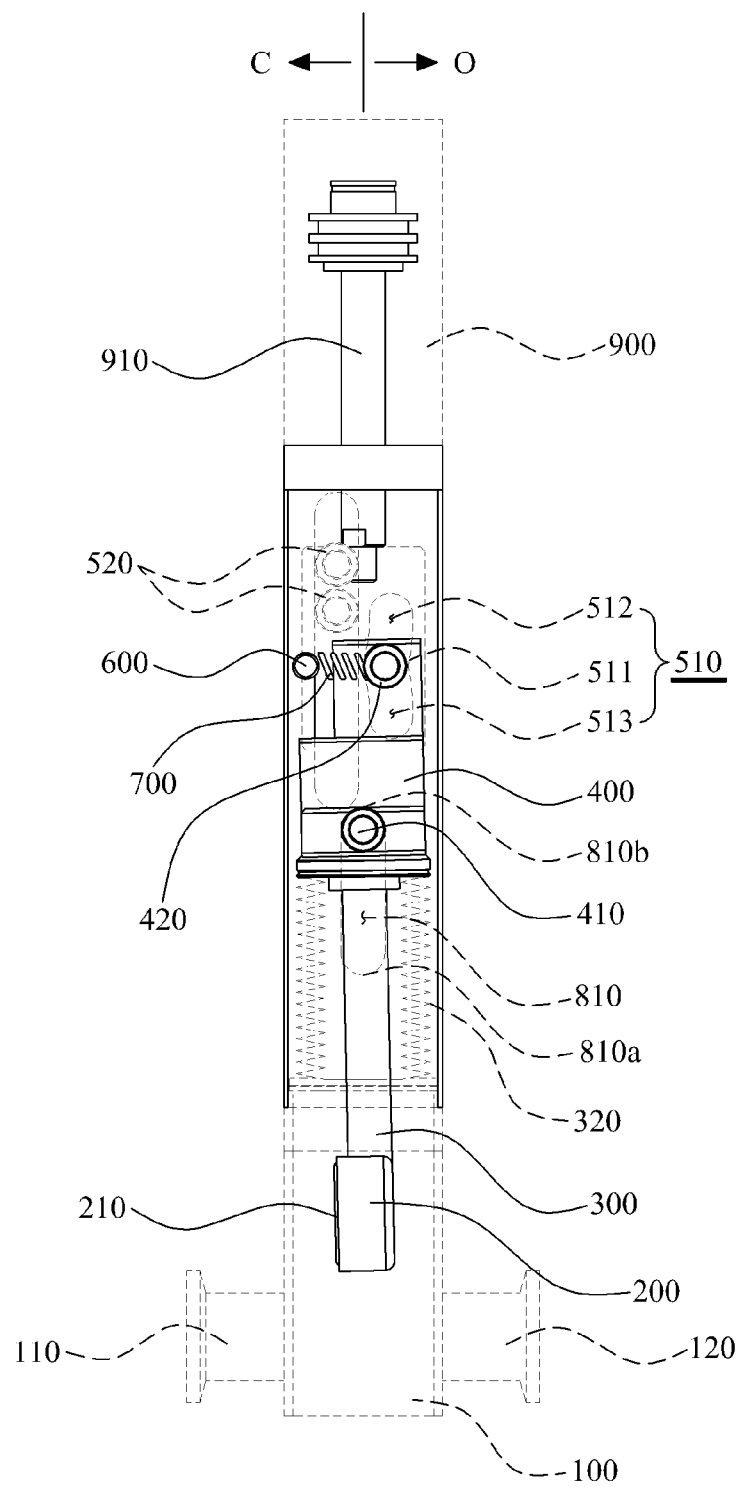
FIG. 4 is a coupling state view illustrating a state in which components provided in the guide housing in the configuration of the vacuum valve according to the preferred embodiment are coupled.

Next, the valve blade 200 will be described. As illustrated in FIG. 3 or 4, the valve blade 200 is disposed in a fluid flow hole 101 to open and close the inlet 110. According to vertical movement of a piston 910 that will be described later, as a closing surface 201 of the valve blade 200 closely contacts a valve sheet 111 provided around an end of the inlet 110, the valve blade 200 may close or open the inlet 110.

As the valve blade 200 is configured such that the closing surface 201 of the valve blade 200 closely contacts an inner surface 102 of the valve housing 100 while the inlet 110 is opened, a packing ring 210 provided on the closing surface 201 may not be exposed on the fluid flow hole 101 to increase tightness of sealing, thereby fundamentally blocking the packing ring 210 from contacting air and fluid.

Next, the valve rod 300 will be described. As illustrated in FIG. 3, the valve rod 300 having an upper portion on which a connecting projection 310 is provided to be connected to the L-motion block 400 that will be described later and a lower portion coupled to the valve blade 200. The valve rod 300 may vertically and horizontally move according to a position of an L-motion roller 420 of the L-motion block 400, which will be described later, seated on an opening and closing driving guide groove 510 of the driving block 500 that will be described later.

Meanwhile, as illustrated in FIG. 2 or 3, the bellows 320 maintaining air-tightness and surrounding the valve rod 300 may be provided between the valve housing 100 and the L-motion block 400 to guide the vertical movement of the L-motion block 400.

Also, as the bellows 320 serves to separate the valve rod 300 from the guide housing 800 that will be described later, when the inlet 110 is opened, air and fluid are blocked from being introduced into the guide housing 800 through the inlet 110.

Next, the L-motion block 400 will be described. As illustrated in FIG. 2 or 3, the L-motion block 400 has a reverse T shape having a lower portion coupled to the valve rod 300 and an upper portion connected to the driving block 500. The L-motion block 400 includes a stroke roller 410 and an L-motion roller 420.

The stroke roller 410 is rotatably installed on both lower side surfaces of the L-motion block 400 and guides the vertical movement of the L-motion block 400 during an operation process.

Meanwhile, the stroke roller 410 is more biased to the closing direction C than the L-motion roller 420. As illustrated in FIGS. 6(*a*) to 9(*d*), when the L-motion roller 420 is disposed in a protruding groove section 511 protruding to the closing direction C, which will be described later, the valve rod 300 is inclined, and when the L-motion roller 420 is disposed on each of ends 512*a* and 513*a* of first and second inclined groove sections 512 and 513 inclined to the opening direction O, which will be described later, as the valve rod 300 vertically stands, the stroke roller 410 may serve to smoothly perform an opening and closing operation of the inlet 110 and a closely contacting operation of the inner surface 102 of the valve housing 100.

Also, when the L-motion block 400 horizontally moves according to a position of the L-motion roller 420 moving by seating on the opening and closing driving guide groove 510, the stroke roller 410 may serve as a central shaft preventing a lower portion of the L-motion block 400 from horizontally moving by a stroke roller rail groove 810 of the guide housing 800, which will be described later and into which the stroke roller 410 is inserted, and allow only an upper portion of the L-motion block 400 to horizontally move.

The L-motion roller 420 is rotatably installed on both upper side surfaces of the L-motion block 400. The L-motion roller 420 is seated on the opening and closing driving guide groove 510 and allows the valve rod 300 to move in the closing direction C or the opening direction O according to a position of the vertical movement thereof.

Next, the driving block 500 will be described. As illustrated in FIG. 2 or 3, the driving block 500 has an inside into which the upper portion of the L-motion block 400 is inserted and an upper portion connected to the piston 910. The driving block 500 includes the opening and closing driving groove 510 and a guide roller 520.

Figure 5:
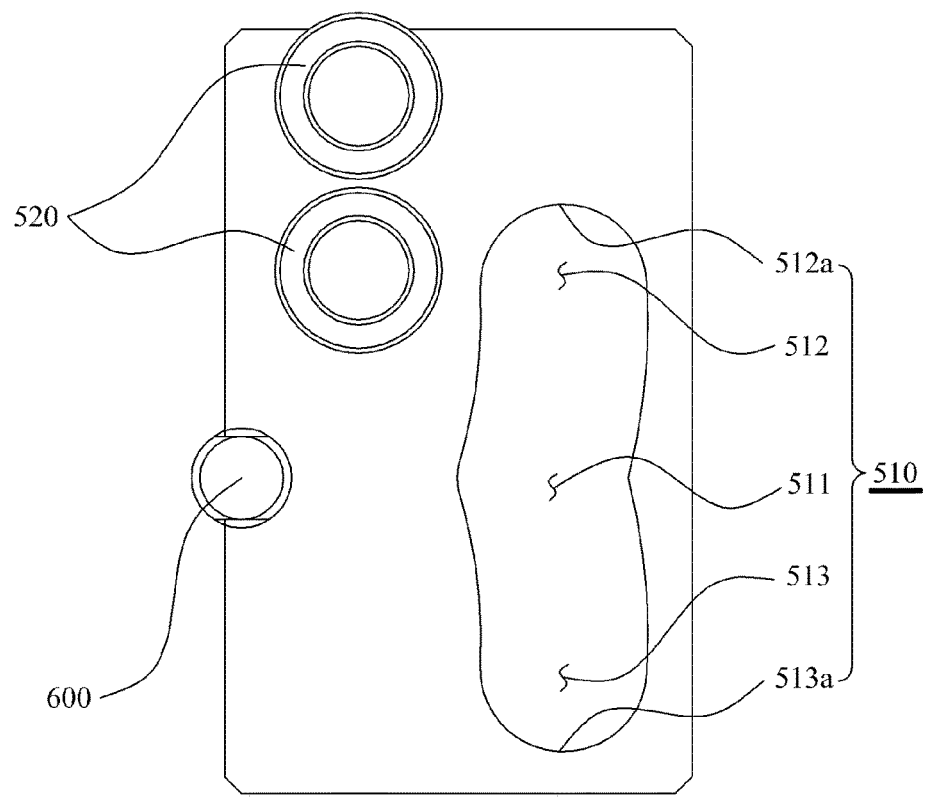
FIG. 5 is a plan view illustrating a driving block in the configuration of the vacuum valve according to the preferred embodiment is closed.
Figure 6A:
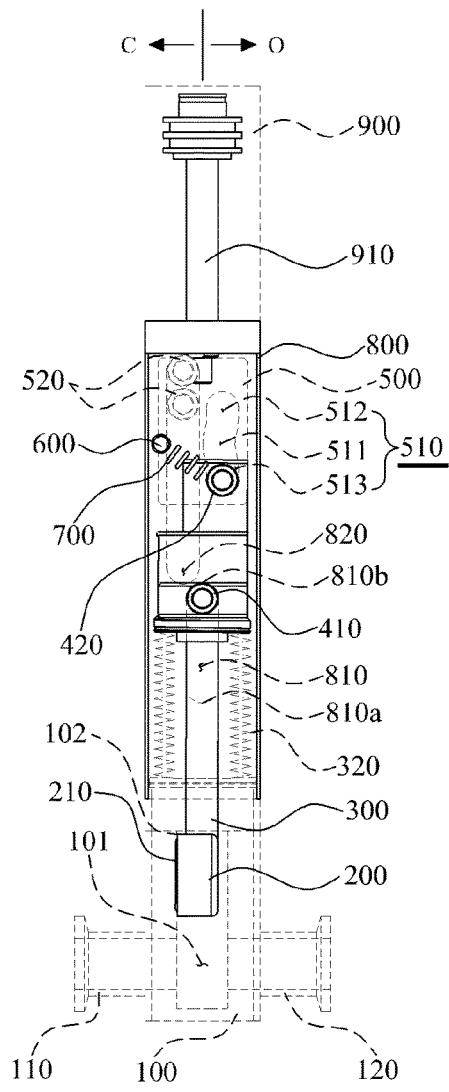
Figure 6B:
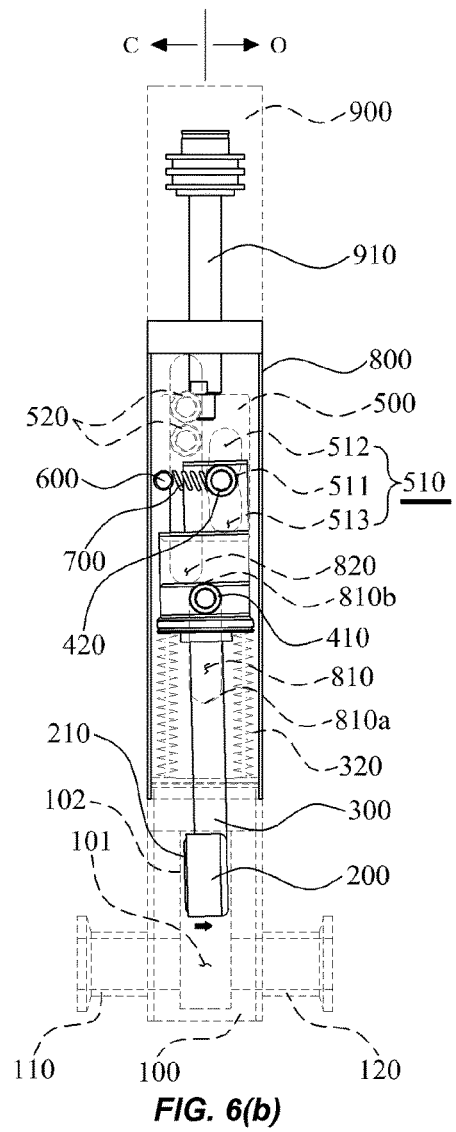

As illustrated in FIG. 5, the opening and closing driving groove 510 is defined in each of both sides of the driving block 500 and in which the L-motion roller 420 is seated. The opening and closing driving groove 510 includes a protruding groove section 511, a first inclined groove section 512, and a second inclined groove section 512.

As illustrated in FIG. 5, the protruding groove section 511 protrudes to the closing direction C. When the L-motion roller 420 is disposed in the protruding groove section 511, the valve blade 200 may maintain a state inclined to the opening direction O with respect to the stroke roller 410.

As illustrated in FIG. 5, the first inclined groove section 512 is gradually inclined to the opening direction O as upward from the protruding groove section 511. When the L-motion roller 420 is disposed at an end 512*a* of the first inclined groove section 512, the valve blade 200 may move to the closing direction C with respect to the stroke roller 410 to close the inlet 110.

As illustrated in FIG. 5, the second inclined groove section 513 is gradually inclined to the opening direction O as downward from the protruding groove section 511. When the L-motion roller 420 is disposed at an end 513*a* of the second inclined groove section 513, the valve blade 200 may move to the closing direction C with respect to the stroke roller 410 to closely contact the inner surface 102 of the housing 100.

Meanwhile, the guide roller 520 is rotatably installed on each of both upper side surfaces of the driving block 500. For smooth operation, two or more guide rollers 520 are desirably provided so that the driving block 500 only vertically operates and does not horizontally move.

Also, as the guide roller 520 is provided on a position at which the guide roller 520 is not interfered by the opening and closing driving guide groove 510, the guide roller 520 may guide vertical movement of the driving block 500 during the operation process.

Meanwhile, as illustrated in FIG. 3 or 4, an elastic member 700 providing elastic force is desirably disposed between the stroke roller 410 seated on the opening and closing driving guide groove 510 and a spring pin 600 disposed on one surface of the driving block 500.

When the valve rod 200 vertically moves to open and close the inlet 110 in an operation process of the vacuum valve 1, the elastic member 700 serves to maintain a state in which the L-motion roller 420 is inserted into the protruding groove section 511 until the stroke roller 410 moves along the stroke roller rail groove 810 by the vertical movement of the piston 910 and reached to a lower end 810*a* or an upper end 810*b* of the stroke roller rail groove to complete the vertical movement of the L-motion block 400.

Also, as illustrated in FIG. 7(*d*), the elastic member 700 allows the driving block 500 to vertically move so that the L-motion roller 420 is disposed on the end 512*a* of the first inclined groove section 512 or the end 513*a* of the second inclined groove section 513 while elastically deformed due to pressure of the piston 910 that continuously and vertically moves even after the stroke roller 410 is reached to the lower end 810*a* or the upper end 810*b* of the stroke roller rail groove 810. Thus, the elastic member 700 may help the smooth operation of present described embodiments, appropriately to the intention thereof.

Next, the guide housing 800 will be described. As illustrated in FIG. 3, the guide housing 800 is coupled to the upper portion of the valve housing 100 to protect and accommodate driving elements such as the L-motion block 400 and the driving block 500. A stroke roller rail groove 810 recessed so that the stroke roller 410 is inserted to move therein and a guide roller rail groove 820 recessed so that the guide roller 52 is inserted to move therein are defined in both inner surfaces of the guide housing 800, respectively.

Next, the cylinder 900 will be described. As illustrated in FIG. 3, the cylinder 900 is coupled to the upper portion of the guide housing 800. The cylinder 900 is connected to the driving block 500 protruding to be connected to the driving block 500 while maintaining sealing between the inside and the outside of the cylinder 900 and includes the piston 910 vertically moving by hydraulic pressure.

Since a principle of configuring and operating the cylinder 900 is well known to those skilled in the art, detailed description regarding this will be omitted.

Hereinafter, referring to FIGS. 6(*a*) to 9(*d*), an operation state of the vacuum valve 1 according to a preferred embodiment will be described.

FIGS. 6(*a*), 6(*b*), 7(*c*), and 7(*d*) are operation state views illustrating a state in which the inlet 110 in the configuration of the vacuum valve 1 according to the preferred embodiment is being closed, and FIGS. 8(a), 8(b), 9(c), and 9(d) are operation state views illustrating a state in which the inlet 110 in the configuration of the vacuum valve 1 according to the preferred embodiment is being opened.

Referring to FIGS. 8(a), 8(b), 9(c), and 9(d), a process in which the inlet 110 is opened and the valve blade 200 closely contacts the inner surface 102 of the valve housing 100, which is a characteristic of the described embodiments, will be described.

Figures 8A, 8B:
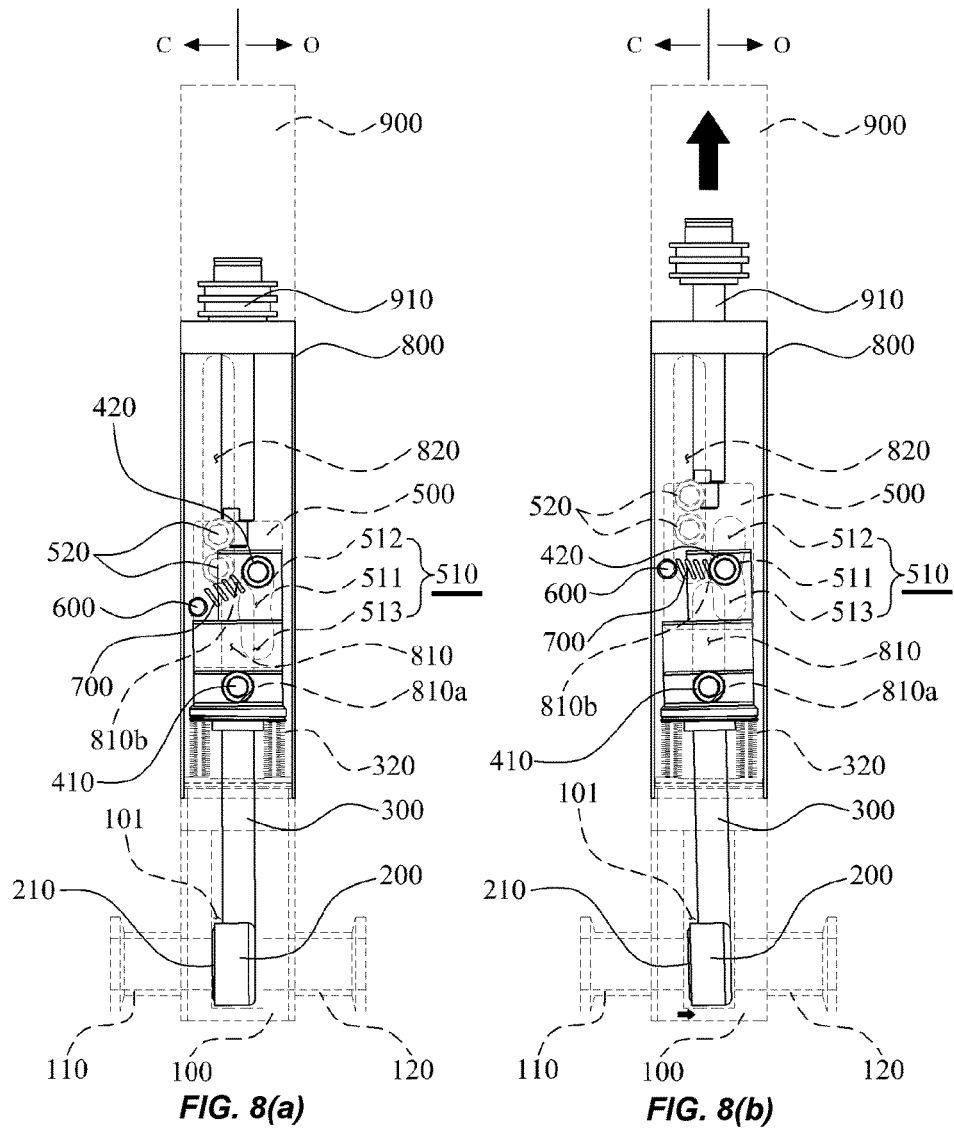
FIGS. 8(a) and 8(b) and 9(c) and 9(d) are operation state views illustrating a state in which the inlet among the configuration of the vacuum valve according to the preferred embodiment is being opened.

First, as illustrated in FIG. 8(a), when descending of the piston 910 is finished, the inlet 110 maintains a closing state in which the closing surface 201 of the valve blade 200 closely contacts the valve sheet 11 provided around the end side of the inlet 110.

In this case, the stroke roller 410 is disposed on the lower end 810a of the stroke roller rail groove 810, the L-motion roller L-motion roller 420 is disposed on the end 512a of the first inclined groove section 512, and the elastic member 700 connected between the L-motion roller 420 and the spring pin 600 maintains a downward tensile state.

Also, the bellows 320 is compressed because the descending of the piston 910 is completed.

In the above-described state, as tensile force of the elastic member 700 is released when the piston 910 ascends, the driving block 500 ascends to move the L-motion roller 420 from the end 512a of the first inclined groove section 512 to the protruding groove section 511.

As illustrated in FIG. 8B, while the L-motion roller 420 moves from the first inclined groove section 512 to the protruding groove section 511, the valve rod 300 horizontally moves to the opening direction O with respect to the stroke roller 410 and is changed from a standing state to an inclined state, and at the same time, as the valve blade 200 closely contacting the valve sheet 111 horizontally moves together with the valve rod 300, the inlet 110 is opened.

Figure 9C:
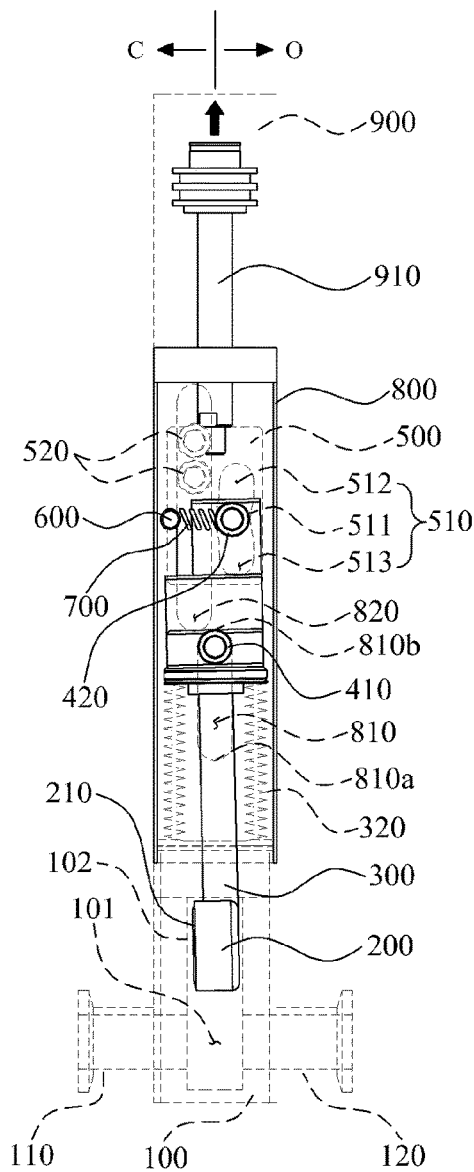

In the above-described state, as illustrated in FIG. 9(c), when the piston 910 continues to ascend, while the L-motion roller 420 is seated on the protruding groove section 511, the bellows 320 is restored from a compressed state to an original sate, and the valve rod 300, the L-motion block 400, and the driving block 500 ascends.

As the valve rod 300 ascends, the valve blade 200 is deviated from a horizontal path of the inlet 110 and the outlet 120 and disposed on an upper portion of the fluid flow hole 101, and thus the inlet 110 is completely opened.

Meanwhile, when the piston 910 continues to ascend, the stroke roller 410 is disposed on the upper end 810a of the stroke rail groove 810. When the piston 910 continues to ascend in a state in which the stroke roller 410 is disposed on the upper end 810a of the stroke rail groove 810, the driving block 500 ascends to move the L-motion roller 420 from the protruding groove section 511 to the second inclined groove section 513. The elastic member 700 connected between the L-motion roller 420 and the spring pin 600 maintains an upward tensile state due to the ascending of the driving block 500.

Figure 9D:
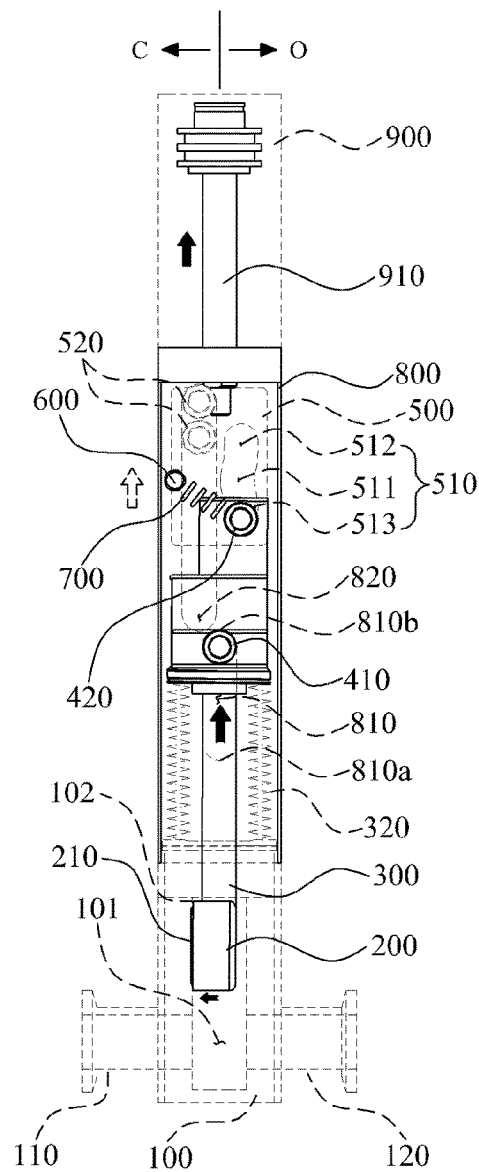

As illustrated in FIG. 9(d), while the L-motion roller 420 moves from the protruding groove section 511 to the second inclined groove section 513, the valve rod 300 horizontally moves to the closing direction C with respect to the stroke roller 410 and is changed from the inclined state to the standing state, and at the same time, as the L-motion roller 420 horizontally moves together with the valve rod 300 at a position deviated from the horizontal path of the inlet 110 and the outlet 120, the closing surface 201 of the valve blade 200 and the inner surface 102 of the valve housing 100 closely contact each other.

Due to the above-described state, as sealing of the packing ring 210 provided on the closing surface 201 of the valve blade 200 is maintained, the packing ring 210 may be fundamentally prevented from contacting the air and the fluid to improve product performance of the packing ring 210 and extend a replacement period of the packing ring 210.

Meanwhile, as illustrated in FIG. 6(a), 6(b), 7(c), or 7(d), a process of closing the inlet 110 is performed in a reverse order of the above-described process of opening the inlet 110.

Figure 10:
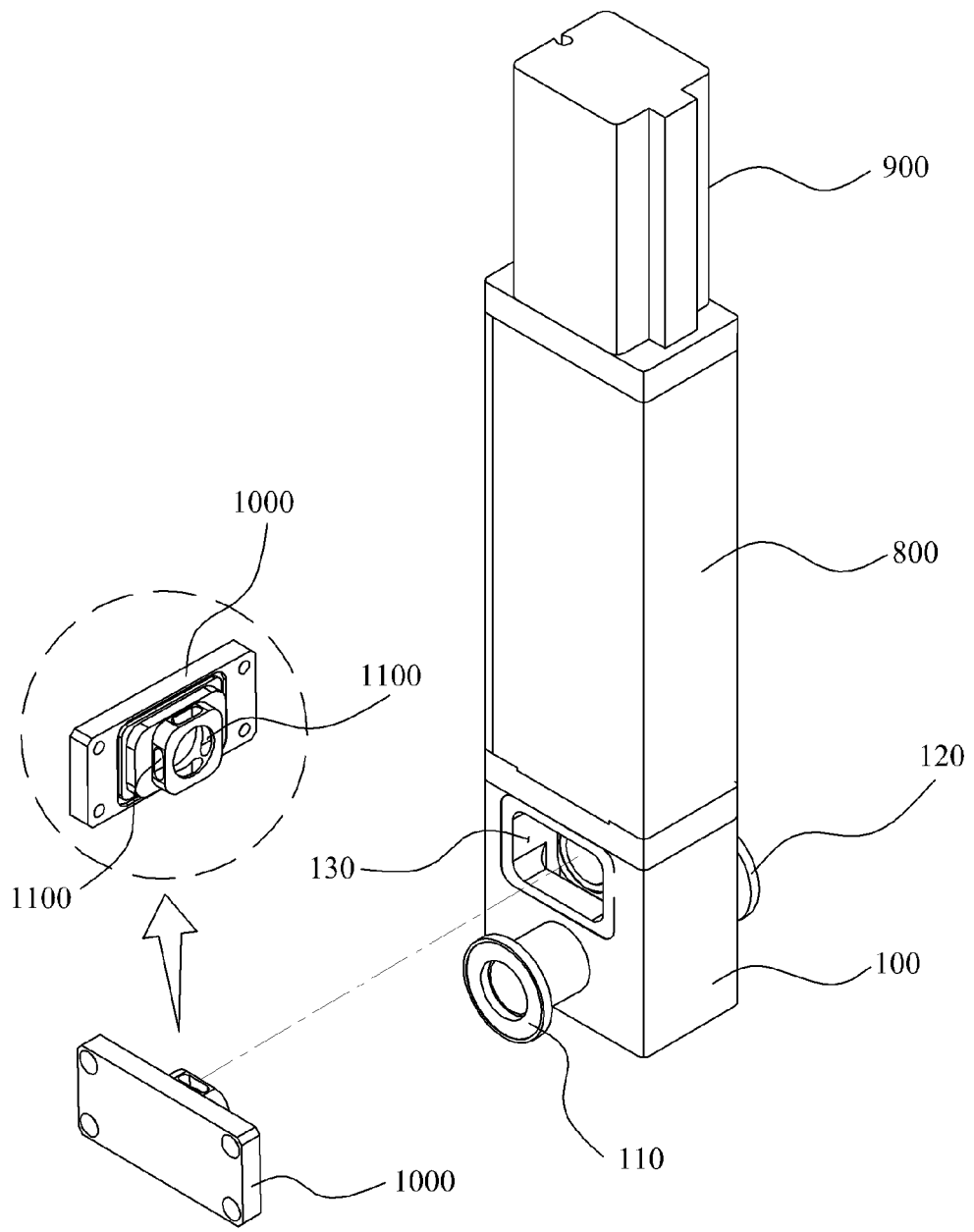
FIG. 10 is an exploded perspective view illustrating a state in which a valve housing and a valve blade clean guider in the configuration of the vacuum valve according to the preferred embodiment are being coupled.
Figure 11:
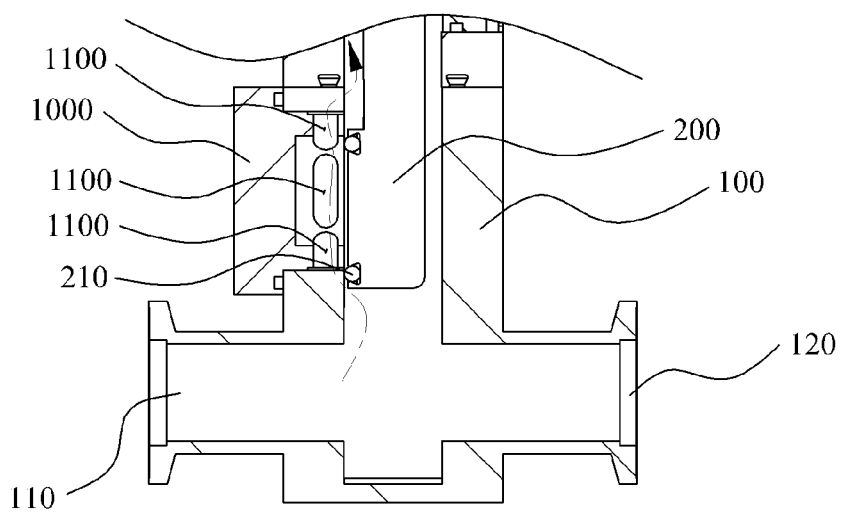
FIG. 11 is a partial cross-sectional view illustrating a cross-section of the valve housing and the valve blade clean guider in the configuration of the vacuum valve according to the preferred embodiment.

Meanwhile, as illustrated in FIG. 10 or 11, the coupling hole 130 perforated in a side surface, in which the inlet 110 is defined, of the valve housing 100 is provided, and the valve blade clean guider 1000 coupled to the coupling hole 130 is provided.

Due to this, when a purified gas is injected in a state in which the closing surface 201 of the valve blade 200 closely contacts the inner surface 102 of the valve housing 100, as the purified gas removes process by-products existing on the closing surface 201 of the valve blade 200 while passing therethrough, the valve blade 200 and the packing ring 210 may extend in product lifecycle.

Optimized embodiments are disclosed in the drawings and the specification. While specific terms were used, they were not used to limit the meaning or the scope of the following claims, but merely used to explain contemplated embodiments. Accordingly, a person having ordinary skill in the art will understand from the above that various modifications and other equivalent embodiments are also possible.

The invention claimed is:
1. A vacuum valve comprising:
  a valve housing comprising a fluid flow hole defined therein and on which an inlet through which fluid is introduced and an outlet through which fluid is discharged are provided;
  a valve blade disposed in the valve housing to open and close the inlet;
  a valve rod connected to the valve blade and comprising a connecting projection protruding from an upper portion thereof;
  an L-motion block connected to the connecting projection and comprising stroke rollers respectively provided on both sides of a lower portion thereof and L-motion rollers respectively provided on both sides of an upper portion thereof;
  a driving block connected to the L-motion block and comprising opening and closing driving guide grooves respectively defined in both sides thereof so that the L-motion rollers are respectively inserted into the opening and closing driving guide grooves to vertically move;
  a spring pin provided on one surface of the driving block;
  an elastic member provided between the spring pin and each of the L-motion rollers;
  a guide housing coupled to an upper portion of the valve housing and comprising stroke roller rail grooves recessed so that the stroke rollers are respectively inserted therein and defined in an inner surface of both sides surfaces thereof;
  a cylinder detachably coupled to an upper portion of the guide housing;

a piston protruding to be connected to the driving block while maintaining a sealing between the inside and the outside of the cylinder and vertically moving by hydraulic pressure, wherein each of the stroke rollers is disposed offset in a closing direction from the L-motion roller.

2. The vacuum valve of claim 1, wherein when each of the opening and closing driving guide grooves has a protruding groove section protruding to the closing direction, and the L-motion roller is disposed in the protruding groove section, the valve blade is inclined to an opening direction with respect to the stroke roller.

3. The vacuum valve of claim 2, wherein when a first inclined groove section inclined to the opening direction as upward from the protruding groove section is provided, and the L-motion roller is disposed at an end of the first inclined groove section, the valve blade moves to the closing direction with respect to the stroke roller to close the inlet.

4. The vacuum valve of claim 3, wherein when a second inclined groove section inclined to the opening direction as downward from the protruding groove section is provided, and the L-motion roller is disposed at an end of the second inclined groove section, the valve blade moves to the closing direction with respect to the stroke roller to closely contact an inner surface of the housing.

5. The vacuum valve of claim 1, wherein a coupling hole perforated in a side surface, on which the inlet is provided, of the valve housing is provided, and a valve blade clean guider coupled to the coupling hole and having a gas flow hole through which a purified gas flows to remove process by-products existing on a closing surface of the valve blade is provided.

* * * * *